United States Patent
Tsao et al.

(10) Patent No.: US 8,072,162 B2
(45) Date of Patent: Dec. 6, 2011

(54) BI-DIRECTION CONSTANT CURRENT DEVICE

(75) Inventors: Yung Ming Tsao, Kaohsiung (TW); Li-Hsuan Huang, Taipei (TW)

(73) Assignee: Lighting Device Technologies Corp., Hsinchu (TW)

( * ) Notice: Subject to any disclaimer, the term of this patent is extended or adjusted under 35 U.S.C. 154(b) by 383 days.

(21) Appl. No.: 12/436,999

(22) Filed: May 7, 2009

(65) Prior Publication Data

US 2010/0283406 A1 Nov. 11, 2010

(51) Int. Cl.
*H05B 37/02* (2006.01)
(52) U.S. Cl. .................... 315/307; 315/287; 315/209 R; 326/82
(58) Field of Classification Search ............. 326/82–87; 315/200 R, 224, 209 R, 246, 250, 287, 291, 315/294, 312, 307
See application file for complete search history.

(56) References Cited

U.S. PATENT DOCUMENTS

| | | | | | |
|---|---|---|---|---|---|
| 4,939,426 | A | * | 7/1990 | Menard et al. | 315/192 |
| 5,627,480 | A | * | 5/1997 | Young et al. | 326/17 |
| 5,736,870 | A | * | 4/1998 | Greason et al. | 326/86 |
| 7,692,450 | B2 | * | 4/2010 | Aranovsky | 326/82 |
| 2002/0043943 | A1 | * | 4/2002 | Menzer et al. | 315/291 |
| 2006/0290381 | A1 | * | 12/2006 | Bui et al. | 326/91 |
| 2009/0224689 | A1 | * | 9/2009 | Yang | 315/291 |

* cited by examiner

*Primary Examiner* — Don Le
(74) *Attorney, Agent, or Firm* — Rosenberg, Klein & Lee

(57) ABSTRACT

An LED lamp includes a bi-direction constant current device coupled between a power supply and a LED load to provide stable positive and negative currents to the LED load. The bi-direction constant current device includes a pair of current sources face-to-face or back-to-back connected in series between the power supply and the LED load, and two protective elements shunt to the pair of current sources, respectively.

37 Claims, 12 Drawing Sheets

US 8,072,162 B2

BI-DIRECTION CONSTANT CURRENT DEVICE

FIELD OF THE INVENTION

The present invention is related generally to a LED lamp and, more particularly, to a bi-direction constant current device for a LED lamp.

BACKGROUND OF THE INVENTION

A direct-current (DC) LED lamp must be equipped with a rectifier circuit or a power converter to convert an alternating current (AC) power supply into a DC power supply for the LED. Since the rectifier circuit as well as the power converter requires a large capacitor and a larger printed circuit board, the resultant DC LED lamp is bulky and expensive. On the other hand, an AC LED lamp typically includes a resistor connected in series between an AC power supply and LEDs oriented in two opposite directions, in which the LEDs in one direction is lit up during the positive half cycle of the AC power supply, and the LEDs in the other direction is lit up during the negative half cycle of the AC power supply. Since only one resistor is needed, an AC LED lamp has smaller volume and lower cost than its DC counterpart. However, for an AC LED lamp, an AC power supply is directly applied to the LEDs, a surge of the AC power supply may damage or even burn the LEDs. In particular, when a commercial AC power supply is subjected to unstable voltage, such as when power resumes after failure or when voltage resumes from a transient voltage drop, a transient high voltage tends to occur and may easily burn the LEDs. Presently, the only solution is to limit the maximum value of LED current by means of a series resistor having high resistance, but this approach has its defects. Firstly, the series resistor consumes a large percentage of power and therefore generates a lot of heat. Secondly, a dilemma takes place due to the fact that the brightness of LEDs is determined by their drive current. More specifically, if a series resistor having higher resistance is used, a better protection will nevertheless result in lower LED current such that the resultant LED lamp operates at lower efficiency. On the contrary, if the series resistor has lower resistance, the LED current will increase, but the LEDs are more likely to be burned out. In addition, as a series resistor lacks adaptability, and the LED current varies with the power supply voltage and the electric properties of the LEDs, it will be very difficult to determine the resistance of the series resistor to be used. Moreover, now that the LED current varies with the power supply voltage, it is impossible to control the brightness of the LED lamp.

SUMMARY OF THE INVENTION

An object of the present invention is to provide a bi-direction constant current device for a LED lamp.

Another object of the present invention is to provide a LED lamp.

According to the present invention, a LED lamp includes two power input terminals for receiving a power source, a LED load, and a bi-direction constant current device connected in series with the LED load between the two power input terminals. The bi-direction constant current device provides a first current in a first direction to the LED load when in a first state and provides a second current in a second direction to the LED load when in a second state. The bi-direction constant current device includes two connecting terminals, two current sources connected in series between the two connecting terminals, and two protective elements shunt to the two current sources, respectively. In the first state, the first current source and the second protective element establish the first current flowing from the first connecting terminal to the second connecting terminal to supply to the LED load. In the second state, the second current source and the first protective element establish the second current flowing from the second connecting terminal to the first connecting terminal to supply to the LED load.

The bi-direction constant current device according to the present invention is capable of providing stable current in two opposite directions to light up LEDs, and thus the brightness of the LED lamp can be well controlled and the LEDs can be prevented from being burned out. Moreover, the bi-direction constant current device according to the present invention can be integrated within an integrated circuit having two pins, thereby minimizing the space occupied by the bi-direction constant current device.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
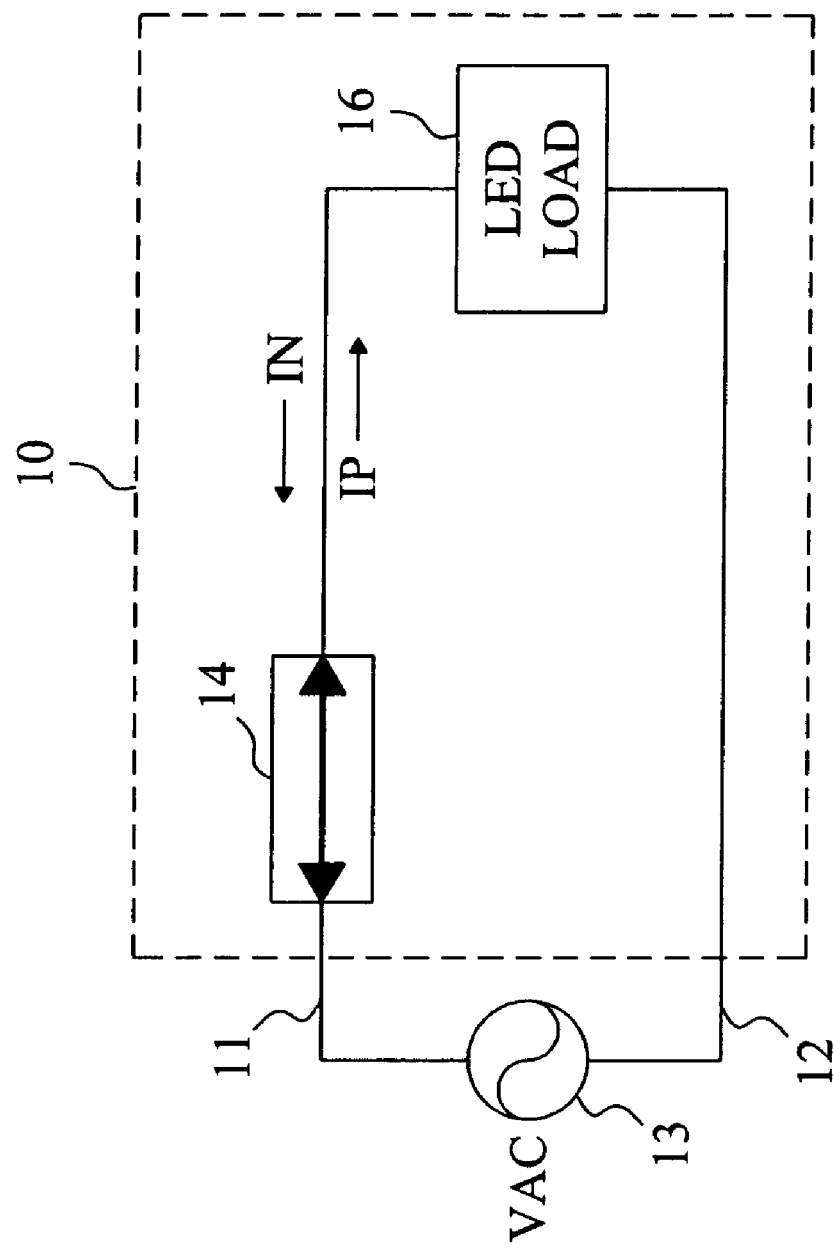
FIG. 1 is a circuit diagram showing an AC LED lamp using a bi-direction constant current device according to the present invention.
Figure 2:
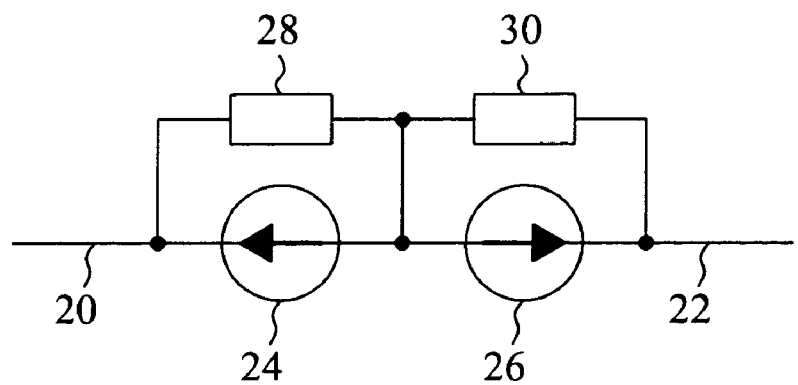
FIG. 2 is a circuit diagram showing a first embodiment of the bi-direction constant current device according to the present invention.
Figure 3:
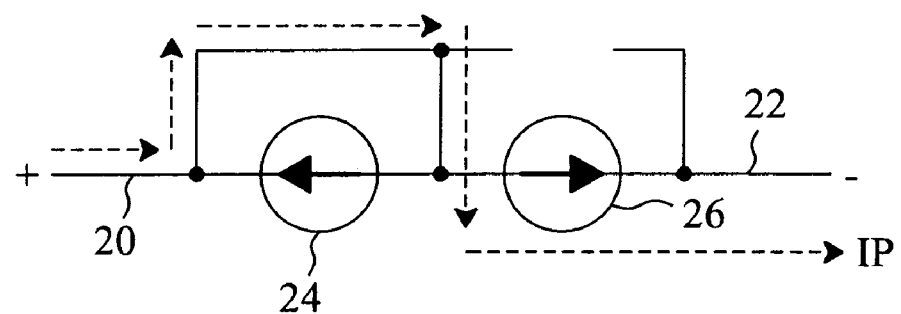
FIG. 3 is a circuit diagram showing one state of the bi-direction constant current device of FIG. 2 when the first connecting terminal of the bi-direction constant current device is coupled with a positive voltage.
Figure 4:
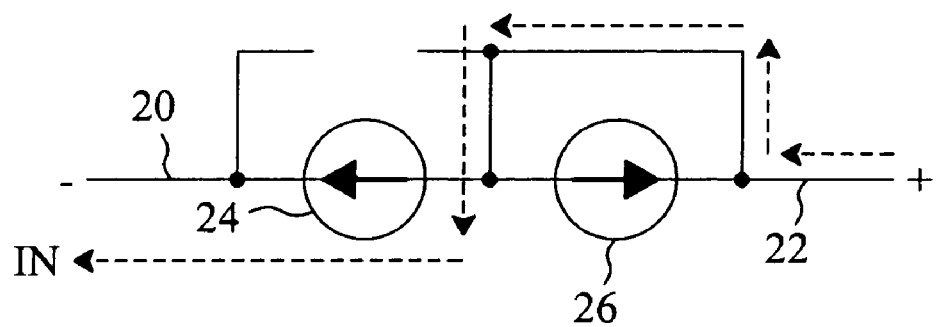
FIG. 4 is a circuit diagram showing one state of the bi-direction constant current device of FIG. 2 when the first connecting terminal of the bi-direction constant current device is coupled with a negative voltage.

FIG. 1 is a circuit diagram showing an alternating current (AC) LED lamp 10 using a bi-direction constant current device 14 according to the present invention. The AC LED lamp 10 has two power input terminals 11 and 12 to be coupled with an AC power supply 13. The bi-direction constant current device 14 in the AC LED lamp 10 generates a positive current IP and a negative current IN according to an AC voltage VAC provided by the AC power supply 13 to supply to a LED load 16 which includes a plurality of LEDs. FIG. 2 is a circuit diagram showing a first embodiment of the bi-direction constant current device 14, in which two constant current sources 24 and 26 are back-to-back connected in series between two connecting terminals 20 and 22 of the bi-direction constant current device 14, and two protective elements 28 and 30 are shunt to the constant current sources 24 and 26 to protect thereto, respectively. The constant current sources 24, 26 and the protective elements 28, 30 can be integrated within an integrated circuit having two pins, and thus the bi-direction constant current device 14 only occupies a small space in the AC LED lamp 10. FIG. 3 and FIG. 4 are diagrams showing two states when the bi-direction constant current device 14 of FIG. 2 operates. Referring to FIG. 3, when a positive voltage is applied to the first connecting terminal 20, the constant current source 24 is reverse biased and the current IP flows from the protective element 28 to the constant current source 26. In this case, the protective element 30 is open circuit, and the constant current source 26 and the protective element 28 establish the current IP that flows from the first connecting terminal 20 to the second connecting terminal 22. Referring to FIG. 4, when a negative voltage is applied to the first connecting terminal 20, the constant current source 26 is reverse biased and the current IN flows from the protective element 30 to the constant current source 24. In this case, the protective element 28 is open circuit, and the constant current source 24 and the protective element 30 establish the current IN that flows from the second connecting terminal 22 to the first connecting terminal 20.

Figure 5:
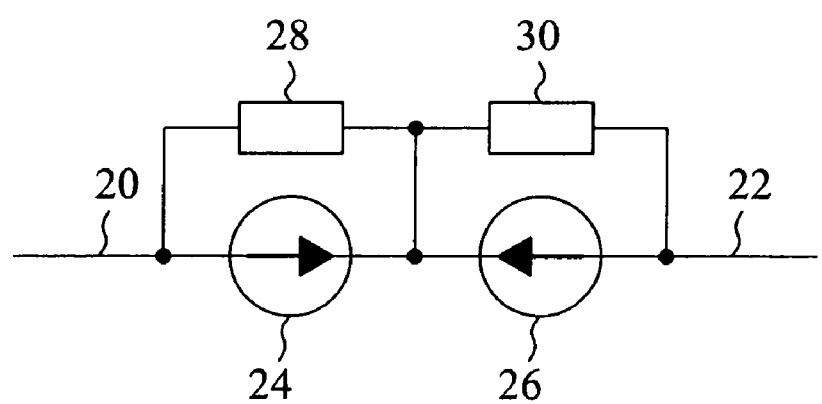
FIG. 5 is a circuit diagram showing a second embodiment of the bi-direction constant current device according to the present invention.
Figure 6:
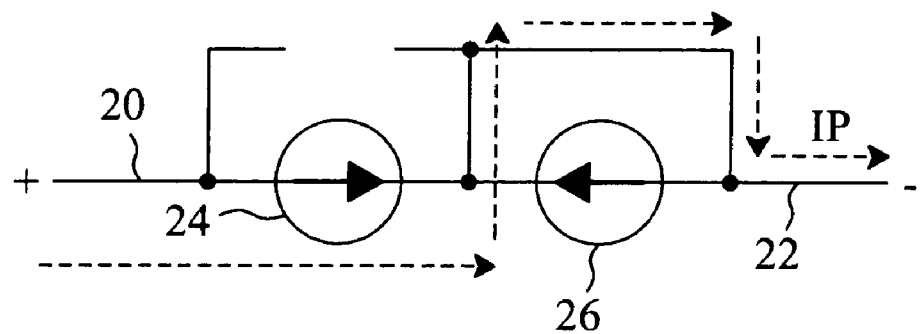
FIG. 6 is a circuit diagram showing one state of the bi-direction constant current device of FIG. 5 when the first connecting terminal of the bi-direction constant current device is coupled with a positive voltage.
Figure 7:
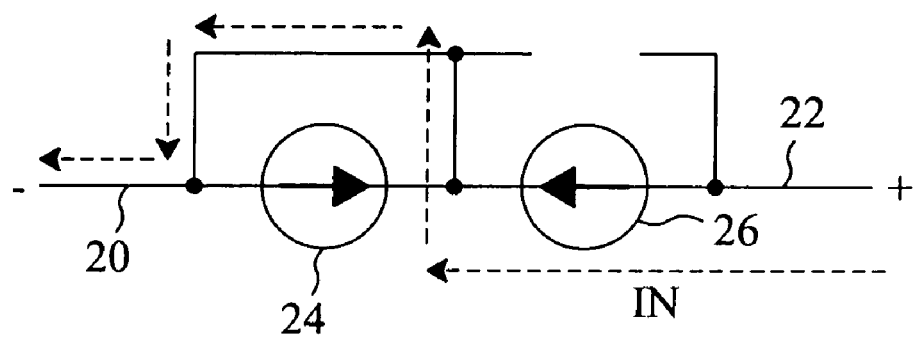
FIG. 7 is a circuit diagram showing one state of the bi-direction constant current device of FIG. 5 when the first connecting terminal of the bi-direction constant current device is coupled with a negative voltage.

FIG. 5 is a circuit diagram showing a second embodiment of the bi-direction constant current device 14 of FIG. 1, which includes constant current sources 24, 26 and protective elements 28, 30 protecting the constant current sources 24, 26, respectively. In this embodiment, the constant current sources 24 and 26 are face-to-face connected in series between the two connecting terminals 20 and 22 of the bi-direction constant current device 14. FIG. 6 and FIG. 7 are diagrams showing two states when the bi-direction constant current device 14 of FIG. 5 operates. Referring to FIG. 6, when a positive voltage is applied to the first connecting terminal 20, the constant current source 26 is reverse biased, and the current IP flows from the constant current source 24 through the protective element 30 to the second connecting terminal 22. In this case, the protective element 28 is open circuit, and the constant current source 24 and the protective element 30 establish the current IP that flows from the first connecting terminal 20 to the second connecting terminal 22. Referring to FIG. 7, when a negative voltage is applied to the first connecting terminal 20, the constant current source 24 is reverse biased and the current IN flows from the constant current source 26 through the protective element 28 to the first connecting terminal 20. In this case, the protective element 30 is open circuit, and the constant current source 26 and the protective element 28 establish the current IN that flows from the second connecting terminal 22 to the first connecting terminal 20.

Figure 8:
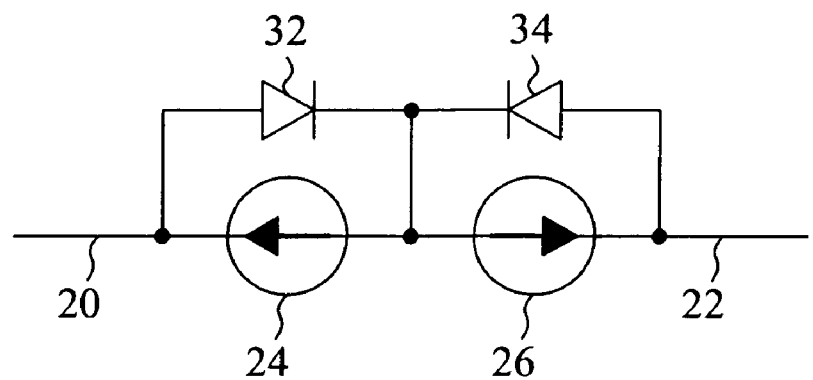
FIG. 8 is a circuit diagram showing an embodiment using diodes as the protective elements of FIG. 2.
Figure 9:
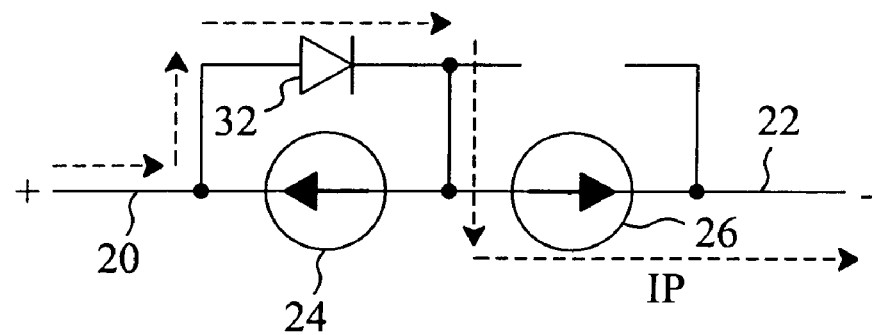
FIG. 9 is a circuit diagram showing one state of the bi-direction constant current device of FIG. 8 when the first connecting terminal of the bi-direction constant current device is coupled with a positive voltage.
Figure 10:
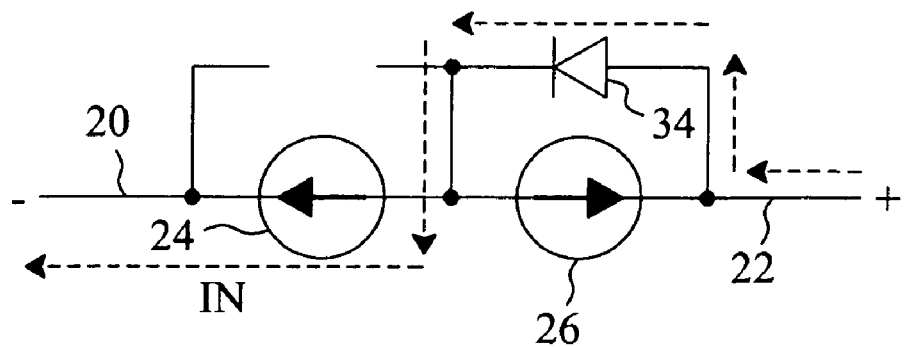
FIG. 10 is a circuit diagram showing one state of the bi-direction constant current device of FIG. 8 when the first connecting terminal of the bi-direction constant current device is coupled with a negative voltage.

FIG. 8 is a circuit diagram showing an embodiment using diodes 32 and 34 as the protective elements 28 and 30 of FIG. 2, in which the diode 32 has an anode and a cathode coupled to the output terminal and the input terminal of the constant current source 24, respectively, and the diode 34 has an anode and a cathode coupled to the output terminal and the input terminal of the constant current source 26, respectively. FIG. 9 and FIG. 10 are diagrams showing two states when the bi-direction constant current device 14 of FIG. 8 operates. Referring to FIG. 9, when a positive voltage is applied to the first connecting terminal 20, the constant current source 24 is reverse biased and is thus turned off, the diode 34 is reverse biased and is thus open circuit, and the diode 32 is forward biased and is thus conductive. In consequence, the constant current source 26 and the diode 32 establish the current IP that flows from the first connecting terminal 20 to the second connecting terminal 22. Referring to FIG. 10, when a negative voltage is applied to the first connecting terminal 20, the constant current source 26 is reverse biased and is thus turned off, the diode 32 is reverse biased and is thus open circuit, and the diode 34 is forward biased and is thus conductive. Hence, the constant current source 24 and the diode 34 establish the current IN that flows from the second connecting terminal 22 to the first connecting terminal 20.

Figure 11:
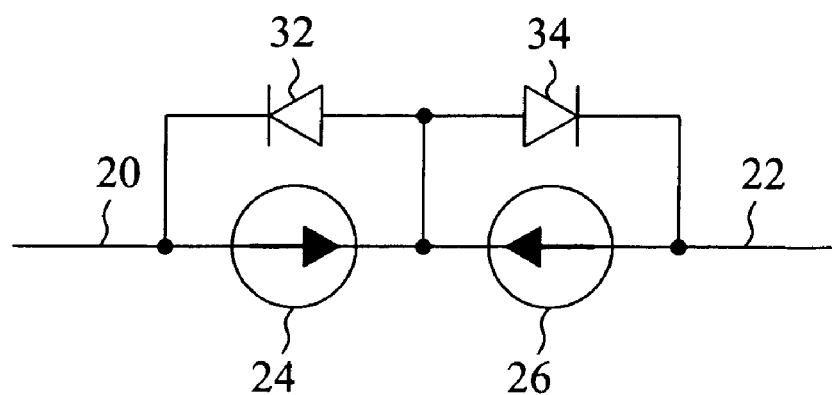
FIG. 11 is a circuit diagram showing an embodiment using diodes as the protective elements of FIG. 5.
Figure 12:
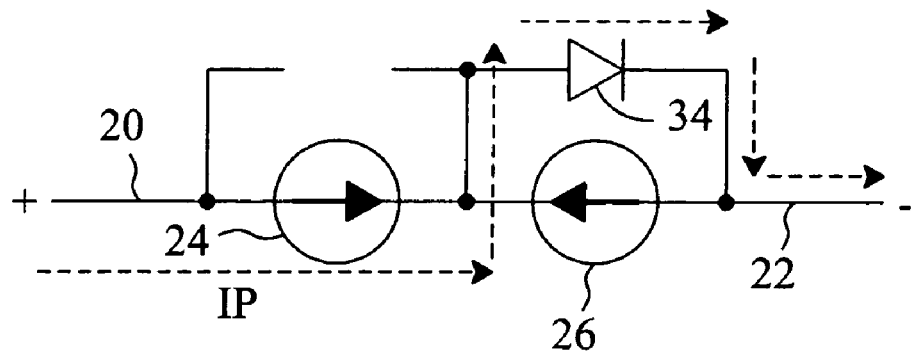
FIG. 12 is a circuit diagram showing one state of the bi-direction constant current device of FIG. 11 when the first connecting terminal of the bi-direction constant current device is coupled with a positive voltage.
Figure 13:
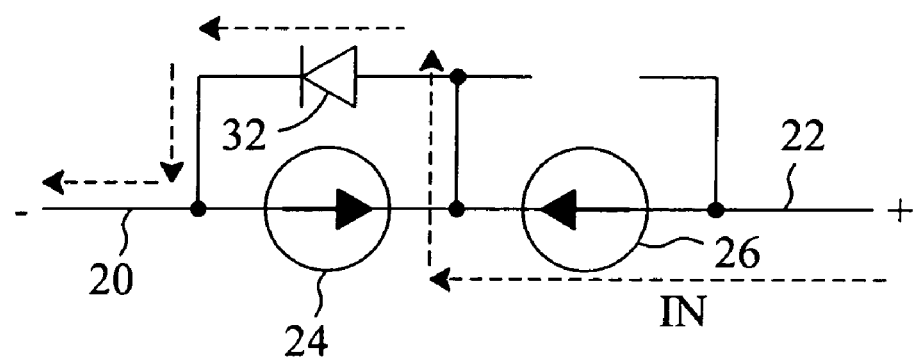
FIG. 13 is a circuit diagram showing one state of the bi-direction constant current device of FIG. 11 when the first connecting terminal of the bi-direction constant current device is coupled with a negative voltage.

FIG. 11 is a circuit diagram showing an embodiment using diodes 32 and 34 as the protective elements 28 and 30 of FIG. 5, in which the diode 32 has an anode and a cathode coupled to the output terminal and the input terminal of the constant current source 24, respectively, and the diode 34 has an anode and a cathode coupled to the output terminal and the input terminal of the constant current source 26, respectively. FIG. 12 and FIG. 13 are diagrams showing two states when the bi-direction constant current device 14 of FIG. 11 operates. Referring to FIG. 12, when a positive voltage is applied to the first connecting terminal 20, the constant current source 26 is reverse biased and is thus turned off, the diode 32 is reverse biased and is thus open circuit, and the diode 34 is forward biased and is thus conductive. As a result, the constant current source 24 and the diode 34 establish the current IP that flows from the first connecting terminal 20 to the second connecting terminal 22. Referring to FIG. 13, when a negative voltage is applied to the first connecting terminal 20, the constant current source 24 is reverse biased and is thus turned off, the diode 34 is reverse biased and is thus open circuit, and the diode 32 is forward biased and is thus conductive. In consequence, the constant current source 26 and the diode 32 establish the current IN that flows from the second connecting terminal 22 to the first connecting terminal 20.

In addition to diodes, the protective elements 28 and 30 shown in FIGS. 2 and 5 can be implemented in many other ways, for example MOS transistors, bipolar junction transistors (BJTs), or other elements or circuits that only allow current to flow in one direction. The bi-direction constant current device 14 according to the present invention is equally applicable to DC LED lamps. However, for a DC LED lamp, the bi-direction constant current device 14 is only provided with DC voltages, and thus only supplies either the positive current IP or the negative current IN to the LED load.

Figure 14:
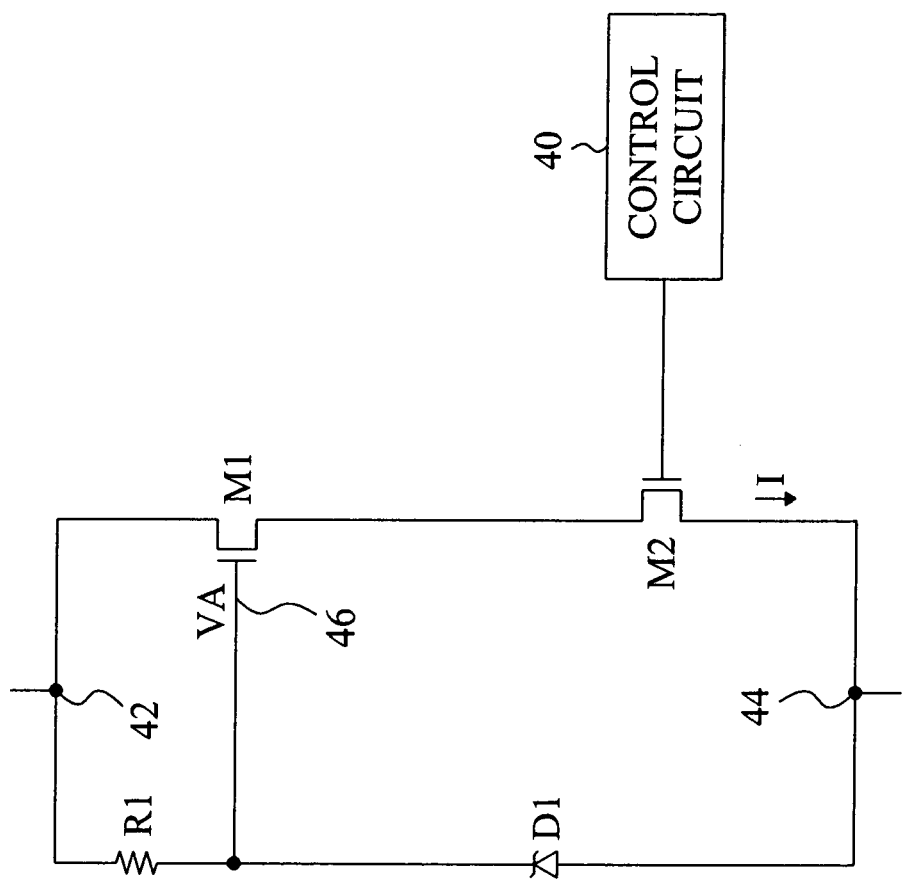
FIG. 14 is a circuit diagram of an embodiment for the constant current sources shown in FIGS. 2 through 13.

FIG. 14 is a circuit diagram of an embodiment for the constant current sources 24 and 26 shown in FIGS. 2 through 13, in which two transistors M1 and M2 are connected in series between a positive voltage terminal 42 and a negative voltage terminal 44, a resistor R1 is coupled between the positive voltage terminal 42 and a gate 46 of the transistor M1, a Zener diode D1 is coupled between the gate 46 of the transistor M1 and the negative voltage terminal 44, and a control circuit 40 is coupled to a gate of the transistor M2 to lock the gate voltage of the transistor M2. Conventional circuitry can be used for the control circuit 40. When the voltage at the positive voltage terminal 42 increases, the gate voltage VA of the transistor M1 will be pulled higher. With the Zener diode D1, however, the gate voltage VA will be eventually limited under a certain level, for example 8.2 V. When the gate voltage VA exceeds a threshold, the transistor M1 will be turned on, thereby sourcing a current I flowing from the positive voltage terminal 42 through the transistors M1 and M2 to the negative voltage terminal 44. Since the control circuit 40 applies a constant voltage to the gate of the transistor M2, the current I is kept constant.

Figure 15:
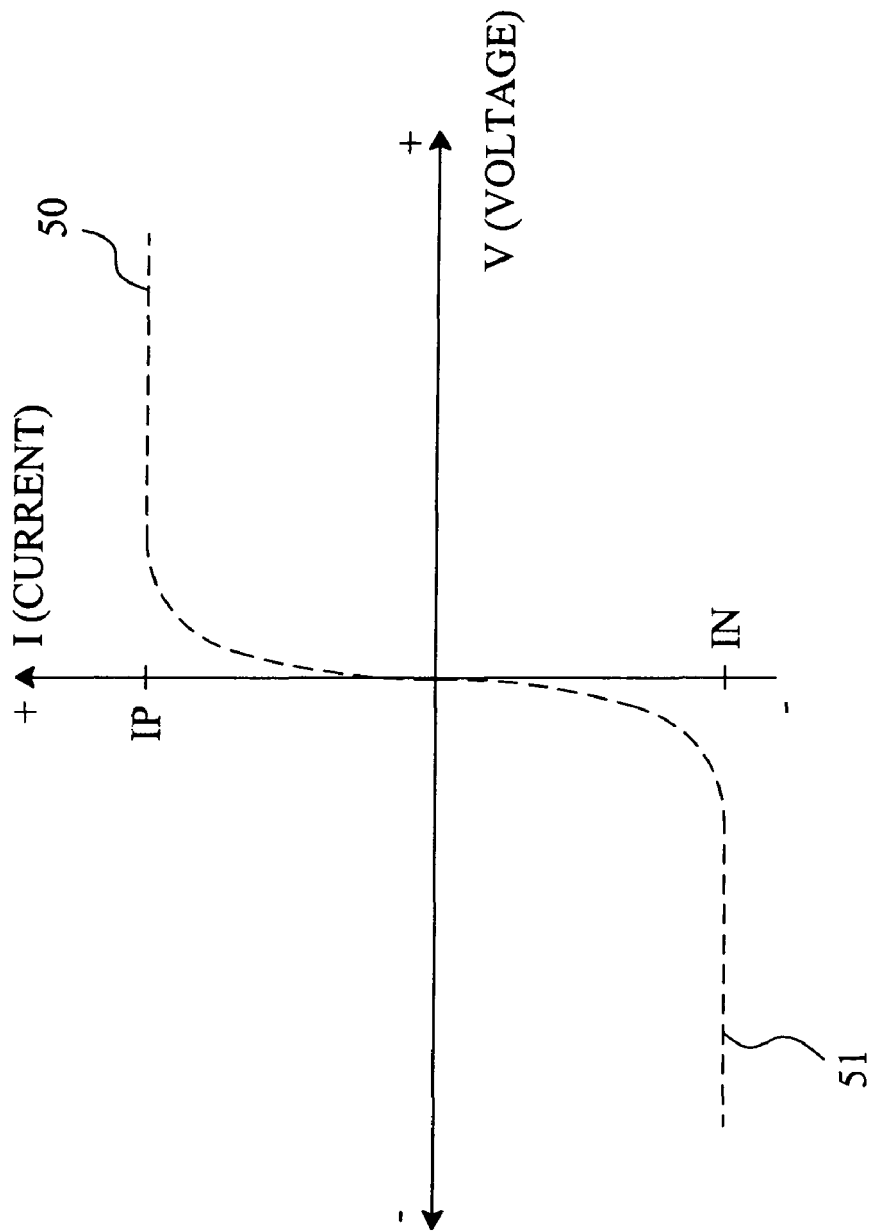
FIG. 15 is a diagram showing an I-V curve of the bi-direction constant current device according to the present invention.

FIG. 15 is a diagram showing an I-V (current vs. voltage) curve of the bi-direction constant current device 14. Referring to FIG. 2, the AC voltage VAC is applied to the first connecting terminal 20 of the bi-direction constant current device 14, with which during the positive half cycle of the AC voltage VAC, the constant current source 26 provides a stable positive current IP, as shown by the curve 50 in the first-quadrant, and during the negative half cycle of the AC voltage VAC, the constant current source 24 provides a stable negative current IN, as shown by the curve 51 in the third-quadrant.

Figure 16:
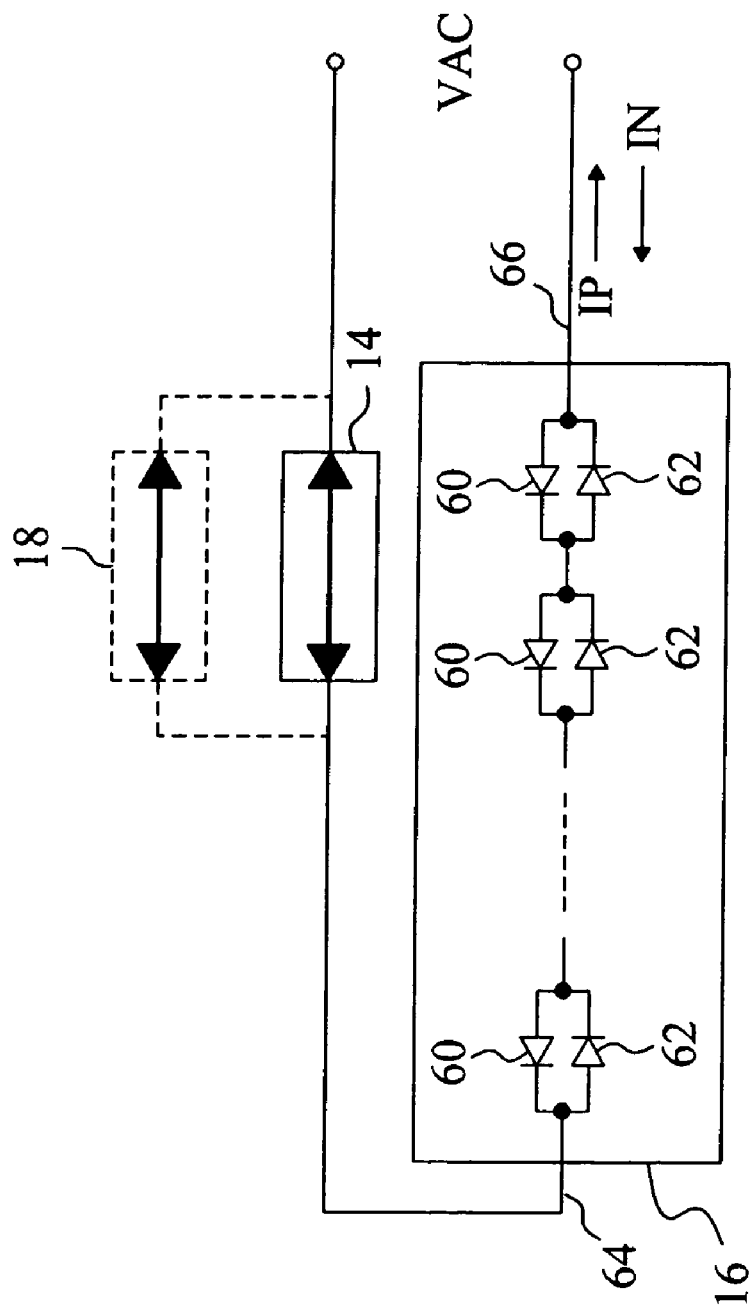
FIG. 16 is a circuit diagram of an embodiment for the LED load shown in FIG. 1.

FIG. 16 is a circuit diagram of an embodiment for the LED load 16 shown in FIG. 1, which includes a plurality of LED pairs connected in series between two connecting terminals 64 and 66, each LED pair having two parallel connected LEDs 60 and 62 oriented in two opposite directions. During the positive half cycle of the AC voltage VAC, the bi-direction constant current device 14 provides a positive current IP to light up the LEDs 62, and during the negative half cycle of the AC voltage VAC, the bi-direction constant current device 14 provides a negative current IN to light up the LEDs 60. The stable positive current IP and stable negative current IN provided by the bi-direction constant current device 14 result in stable brightness of the LEDs 60 and 62. When it is desired to increase the brightness of the LEDs 60 and 62, another bi-direction constant current device 18 is additionally connected in parallel to the bi-direction constant current device 14, as indicated by the dashed-line shown in FIG. 16. Assuming that each of the bi-direction constant current devices 14 and 18 provides a 20 mA current, the two bi-direction constant current devices 14 and 18 connected in parallel will provide a 40 mA current to the LEDs 60 and 62.

Figure 17:
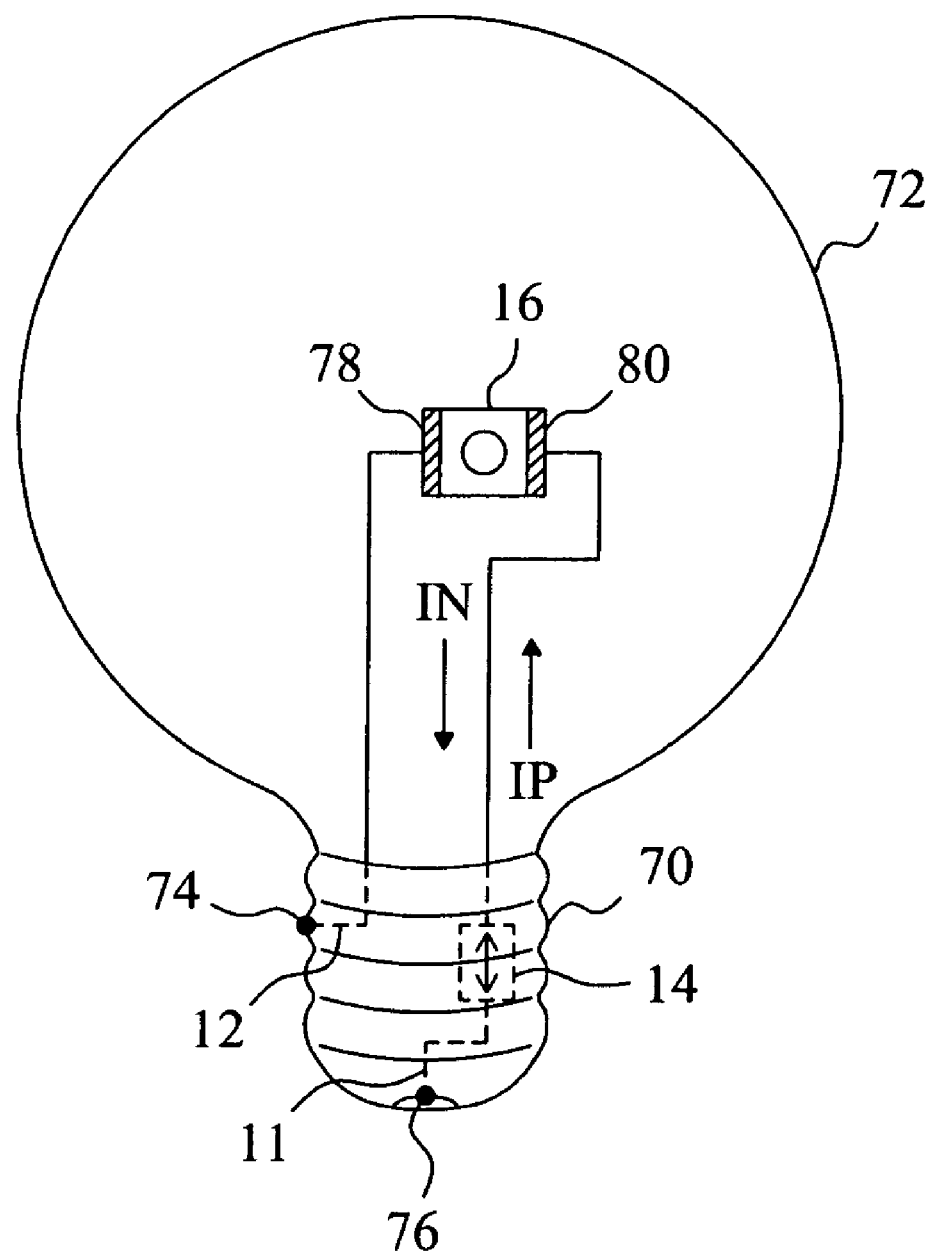
FIG. 17 is a diagram showing a LED light bulb for illumination purposes.
Figure 19:
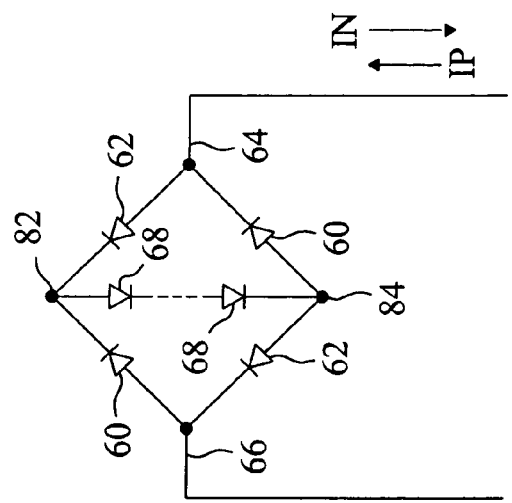
FIG. 19 is a circuit diagram of another embodiment for the LED load 16 shown in FIG. 17.
Figure 18:
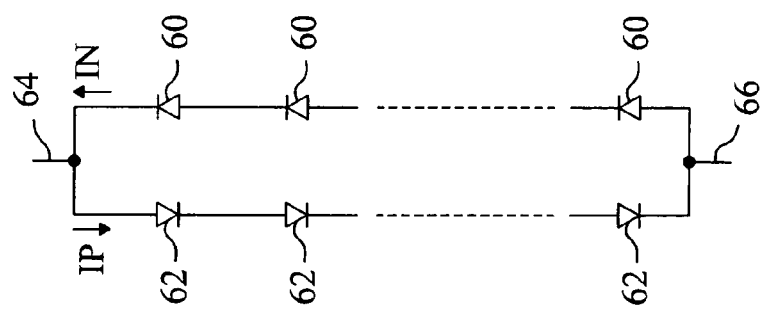
FIG. 18 is a circuit diagram of an embodiment for the LED load shown in FIG. 17.

The bi-direction constant current device 14 according to the present invention is applicable to various types of LED lamps, including, for instance, decorative lamps, indicator lamps, and LED lamps for illumination purposes. FIG. 17 is a diagram showing a LED light bulb for illumination purposes, which includes a lamp shell 72 secured in position to a lamp base 70. In the LED light bulb, the LED load 16 and the bi-direction constant current device 14 are connected in series between the electrodes 74 and 76 of the lamp base 70. In this embodiment, the LED load 16 is an AC LED chip having two pins 78 and 80 coupled to the electrode 74 and the bi-direction constant current device 14, respectively. When the lamp base 70 is coupled to an AC power supply, the bi-direction constant current device 14 may provide bi-direction constant currents IP and IN to light up the LED load 16. FIG. 18 is a circuit diagram of an embodiment for the LED load 16 shown in FIG. 17, which includes two parallel connected LED strings, LEDs 60 and LEDs 62, oriented in two opposite directions. Consequently, the current IP passes through and thereby lights up the LEDs 62, and the current IN in the opposite direction to that of the current IP passes through and thereby lights up the LEDs 60. FIG. 19 is a circuit diagram of another embodiment for the LED load 16 shown in FIG. 17, in which LEDs 60, 62 and 68 are configured in a LED bridge. The current IP passes through and thereby lights up the LEDs 62 and LEDs 68, and the current IN in the opposite direction to that of the current IP passes through and thereby lights up the LEDs 60 and 68.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A bi-direction constant current device for providing current to a load, comprising:
   two connecting terminals;
   two current sources connected in series between the two connecting terminals;
   a first protective element connected in parallel to the first current source; and
   a second protective element connected in parallel to the second current source;
   wherein the first current source and the second protective element establish a first current flowing from the first connecting terminal to the second connecting terminal in a first state, the second current source and the first protective element establish a second current flowing from the second connecting terminal to the first connecting terminal in a second state.

2. The bi-direction constant current device of claim 1, wherein the two current sources are back-to-back connected to each other.

3. The bi-direction constant current device of claim 1, wherein the two current sources are face-to-face connected to each other.

4. The bi-direction constant current device of claim 1, wherein the first current source is off in the second state.

5. The bi-direction constant current device of claim 1, wherein the second current source is off in the first state.

6. The bi-direction constant current device of claim 1, wherein the first protective element is open circuit in the first state.

7. The bi-direction constant current device of claim 1, wherein the second protective element is open circuit in the second state.

8. The bi-direction constant current device of claim 1, wherein the first protective element bypasses the first current source in the second state.

9. The bi-direction constant current device of claim 1, wherein the second protective element bypasses the second current source in the first state.

10. The bi-direction constant current device of claim 1, wherein the first protective element comprises a diode.

11. The bi-direction constant current device of claim 1, wherein the second protective element comprises a diode.

12. The bi-direction constant current device of claim 1, wherein the first and second currents are equal in magnitude.

13. The bi-direction constant current device of claim 1, wherein the first and second currents are different in magnitude.

14. The bi-direction constant current device of claim 1, wherein the first current source comprises:
a positive voltage terminal and a negative voltage terminal;
two transistors connected in series between the positive and negative voltage terminals;
a resistor coupled between the positive voltage terminal and a control electrode of the first transistor;
a Zener diode coupled between the control electrode of the first transistor and the negative voltage terminal; and
a control circuit coupled to a control electrode of the second transistor.

15. The bi-direction constant current device of claim 1, wherein the second current source comprises:
a positive voltage terminal and a negative voltage terminal;
two transistors connected in series between the positive and negative voltage terminals;
a resistor coupled between the positive voltage terminal and a control electrode of the first transistor;
a Zener diode coupled between the control electrode of the first transistor and the negative voltage terminal; and
a control circuit coupled to a control electrode of the second transistor.

16. An LED lamp, comprising:
two power input terminals for being coupled to a power supply;
a LED load; and
a bi-direction constant current device connected in series with the LED load between the two power input terminals, providing a first current in a first direction to the LED load in a first state, and a second current in a second direction to the LED load in a second state.

17. The LED lamp of claim 16, wherein the bi-direction constant current device comprises:
two current sources connected in series;
a first protective element connected in parallel to the first current source; and
a second protective element connected in parallel to the second current source;
wherein the first current source and the second protective element establish the first current in the first state, and the second current source and the first protective element establish the second current in the second state.

18. The LED lamp of claim 17, wherein the two current sources are back-to-back connected to each other.

19. The LED lamp of claim 17, wherein the two current sources are face-to-face connected to each other.

20. The LED lamp of claim 17, wherein the first current source is off in the second state.

21. The LED lamp of claim 17, wherein the second current source is off in the first state.

22. The LED lamp of claim 17, wherein the first protective element is open circuit in the first state.

23. The LED lamp of claim 17, wherein the second protective element is open circuit in the second state.

24. The LED lamp of claim 17, wherein the first protective element bypasses the first current source in the second state.

25. The LED lamp of claim 17, wherein the second protective element bypasses the second current source in the first state.

26. The LED lamp of claim 17, wherein the first protective element comprises a diode.

27. The LED lamp of claim 17, wherein the second protective element comprises a diode.

28. The LED lamp of claim 17, wherein the first and second currents are equal in magnitude.

29. The LED lamp of claim 17, wherein the first and second currents are different in magnitude.

30. The LED lamp of claim 17, wherein the first current source comprises:
a positive voltage terminal and a negative voltage terminal;
two transistors connected in series between the positive and negative voltage terminals;
a resistor coupled between the positive voltage terminal and a control electrode of the first transistor;
a Zener diode coupled between the control electrode of the first transistor and the negative voltage terminal; and
a control circuit coupled to a control electrode of the second transistor.

31. The LED lamp of claim 17, wherein the second current source comprises:
a positive voltage terminal and a negative voltage terminal;
two transistors connected in series between the positive and negative voltage terminals;
a resistor coupled between the positive voltage terminal and a control electrode of the first transistor;
a Zener diode coupled between the control electrode of the first transistor and the negative voltage terminal; and
a control circuit coupled to a control electrode of the second transistor.

32. The LED lamp of claim 16, wherein the LED load comprises:
two connecting terminals; and
a plurality of LED pairs connected in series between the two connecting terminals, each LED pair having two parallel connected LEDs oriented in two directions.

33. The LED lamp of claim 16, wherein the LED load comprises:
two connecting terminals;
a first LED string oriented in the first direction, connected between the two connecting terminals; and
a second LED string oriented in the second direction, connected between the two connecting terminals.

34. The LED lamp of claim 16, wherein the LED load comprises:
two connecting terminals; and
a LED bridge connected between the two connecting terminals, having a plurality of first LEDs oriented in the first direction and a plurality of second LEDs oriented in the second direction.

35. The LED lamp of claim 16, wherein the LED load comprises an alternating current LED chip.

36. The LED lamp of claim 16, further comprising a lamp base having two electrodes coupled to the two power input terminals, respectively.

37. The LED lamp of claim 36, further comprising a lamp shell secured in position to the lamp base.

* * * * *